Mar. 20, 1923.
E. S. EVANS
1,449,147
AUTOMOBILE TIE-DOWN DEVICE
Filed Mar. 4, 1922
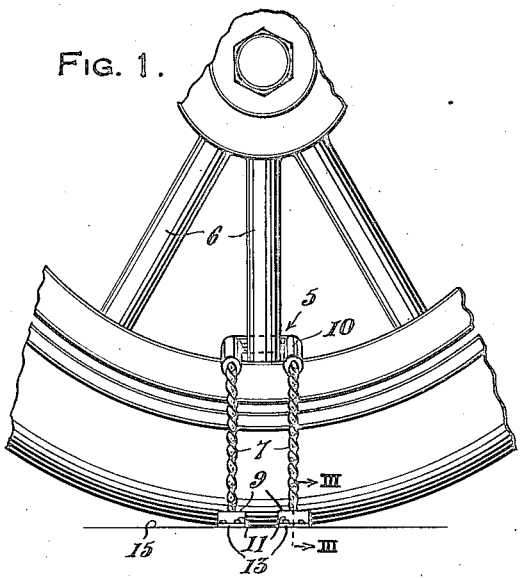
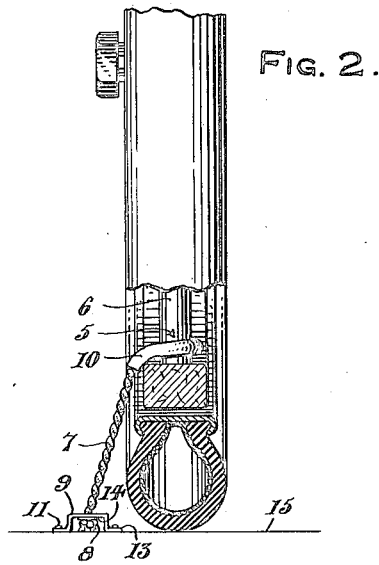
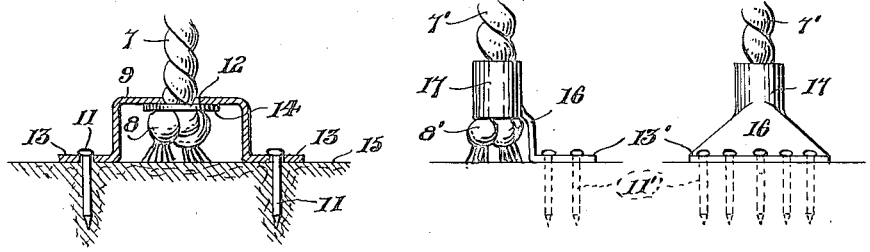
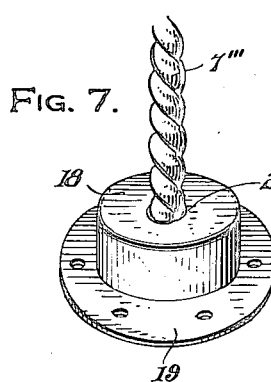
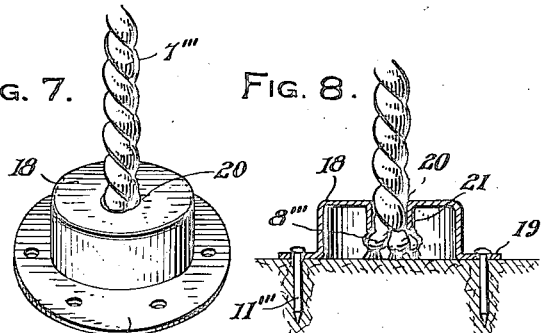
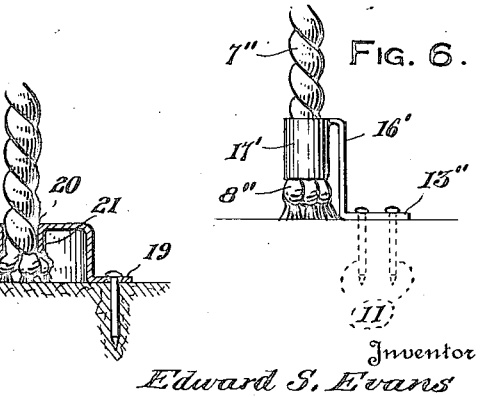
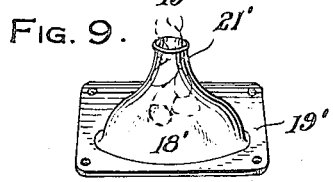
Inventor
Edward S. Evans
By F. K. Bryant
Attorney Patented Mar. 20, 1923.

1,449,147

UNITED STATES PATENT OFFICE.

EDWARD S. EVANS, OF DETROIT, MICHIGAN.

AUTOMOBILE TIE-DOWN DEVICE.

Application filed March 4, 1922. Serial No. 541,005.

*To all whom it may concern:*

Be it known that I, EDWARD S. EVANS, a citizen of the United States of America, residing at Detroit, in the county of Wayne and State of Michigan, have invented certain new and useful Improvements in Automobile Tie-Down Devices, of which the following is a specification.

In loading automobiles, or other vehicles, in or on cars, it is important that the vehicle shall be well anchored in order that it may not be jarred or forced out of position in transit.

Therefore, to accomplish this with absolute positiveness and with a minimum amount of time, labor and expense devoted thereto and without danger of damage to the vehicle, is the primary object of this invention.

More specifically stated, an object of the invention is to provide automobile tie down devices in the nature of anchoring straps which may be previously prepared, and when the vehicle is in position for shipment, the anchor straps may be quickly attached to retain the vehicle in position, and then after the vehicle has arrived at its destination, the anchors may be quickly removed and again used in the same manner as before.

Another object of the invention is to provide an anchor strap of the kind constructed of rope with attached metallic feet forming an attaching means, the rope member of the device giving the latter a slight elasticity whereby the vehicle will be allowed to shift slightly under cushion for absorbing the shocks and jars in such manner as to prevent damage to the vehicle.

Other minor objects and particular advantages of the invention will suggest themselves in the course of the following description and that which is new will be set up in the appended claims.

The preferred forms for the construction of the invention, and one manner of its application to practice are clearly shown in the accompanying drawing, in which—

Figure 1 is a fragmentary side elevational view of an automobile wheel showing the same anchored by means of a tie down device constructed in accordance with the present invention, Figure 2 is a view partly in edge elevation and partly in central vertical section of the device shown in Fig. 1, Figure 3 is an enlarged sectional view taken upon line III—III of Fig. 1, Figure 4 is a view somewhat similar to Fig. 3 but with the metallic foot member in side elevation and showing a modified form of the latter, Figure 5 is a front elevational view of the device shown in Fig. 4, Figure 6 is a view similar to Fig. 4 showing a further modification of metallic foot, Figure 7 is a fragmentary perspective view showing a still further modified form of metallic foot, Figure 8 is a central vertical sectional view of the device shown in Fig. 7 attached to a surface, and Figure 9 is a view similar to Fig. 7 of still another form of foot.

Referring more in detail to the several views, and particularly to the form of the invention illustrated in Figs. 1 to 3 inclusive, the present invention embodies a strap or flexible member consisting in a length of rope adapted to be intermediately return bent as at 5 to embrace a wheel spoke 6 and to provide legs 7 at each side of said return bend extending at an angle to the return bend and terminating in knots 8 which retain metallic feet members 9 upon the free ends of the legs 7, which feet are engageable with a surface such as a car floor to form an attaching means. A padding 10 of fabric or the like is preferably placed upon the return bent portion of the rope member so as to protect the spoke 6 against being marred or scratched, and the rope member is preferably slightly elastic so as to permit slight shifting of the automobile under cushion when the feet 9 are attached to the car floor.

In this form of the invention the feet are shown as consisting of centrally apertured substantially inverted U-shaped strips of metal with their end portions outturned to provide attaching flanges through which nails or the like are driven as at 11 into the surface, the ends of each leg 7 being passed through the central aperture of one attaching foot as at 12. In this way the attaching flanges, which are designated by the numeral 13 flatly engage the surface while the remaining portions of the foot are raised therefrom with the knotted portion 8 located directly beneath the central portion of the foot and preventing the leg 7 from being pulled outwardly through the opening 12 in an efficient manner. If desired, a washer 14 may be employed between the knot 8 and the central portion of the foot.

In the construction of the device, the length of rope is provided with the tube 10 at the desired portion of its length and then the ends of the legs 7 are directed through the apertures 12 of the feet 9, after which the knots 8 are formed for retaining the feet on said legs. In placing the device in use the rope member is intermediately return bent as shown in Figs. 1 and 2 to embrace a wheel spoke 6 and to provide the legs 7 extending at an angle to the return bent portion with the feet engaging the surface 15 and forming an attaching means for reception of the nails 11 or the like.

In the modified form of the invention illustrated in Figs. 4 and 5, the foot consists of a supporting leg 16 having a collar or sleeve 17 upon the upper end thereof and provided with an outturned attaching flange 13' upon its lower end, the collar 17 being at one side of the leg 16 and the flange extending in the opposite direction. In this form of the invention the foot is preferably constructed from a single piece of sheet metal stamped in blank form and then shaped in an obvious manner so that the leg 7' may pass through the collar 17 and be knotted at the lower end of the latter as at 8' for preventing the leg 7' from being pulled outwardly through said collar. The flange 13' is provided with suitable apertures through which nails 11' or the like are driven into the surface such as the car floor whereby the feet are anchored.

In the form of the invention shown in Fig. 6 the construction is substantially the same as in Figs. 4 and 5 except that the collar 17' depends instead of extending upwardly from the supporting leg 16' which has the attaching flange 13'' engaged by the nails 11''. The leg 7'' extends through the collar 17' and is knotted below the latter as at 8'' in this form of the invention.

In the form of the invention shown in Figs. 7 and 8, the attaching means or foot is in the general form of a miniature hat and constructed of metal to provide a crown portion 18 with an annular brim flange 19 and a central opening 20 is provided in the top of the crown portion for passage of the leg 7'' downwardly therethrough. The crown portion is provided with a depending sleeve 21 surrounding the opening 20 through which said leg passes and beneath which it is knotted as at 8'''. The brim flange 19 is provided with suitable openings for reception of fastening nails 11''' or the like.

From the foregoing description it is believed that the construction and operation of the present invention will be readily understood and appreciated by those skilled in the art.

Minor changes may be made in the invention without departing from the spirit and scope thereof as claimed.

The present invention may not only be applied around the spoke as shown, but on wire wheels will be passed over the felly, while in the case of disk wheels the device may be used over the axle or hub, as is well known in the art.

In the form of the invention shown in Fig. 9 the construction is substantially the same as in Fig. 8 except that the crown portion 18' is of substantially bell shape with the sleeve 21' projecting upwardly instead of downwardly. The flange or brim portion 19' has the necessary nail-receiving apertures.

What is claimed as new is:—

1. An anchoring device comprising a securing foot of metal having a raised apertured portion, and a rope tie member having a knotted end portion engaging the apertured portion of the foot and arranged to prevent disengagement from the foot.

2. An anchoring device comprising a rope tie member having the ends of the same formed in knots, and securing feet retained upon the ends of said tie member by said knots, said securing feet each comprising a raised portion through which the tie member extends and having an attaching flange flatly engageable with a surface.

3. An anchoring device for wheel vehicles comprising a rope member adapted to be intermediately return bent to embrace a wheel spoke and to provide legs at each side of said return bend extending at an angle to the return bent portion, said legs terminating in knots, and feet retained upon said legs by said knots and engageable with a surface to form an attaching means, said feet each including an inverted substantially U-shape strip of metal with the tie member extending through the central portions thereof and provided with outturned ends forming attaching flanges.

4. An anchoring device comprising securing feet each having an apertured raised portion and an attaching flange engageable with a surface to form an attaching means, and a flexible tie member having each end passed through the aperture of a securing foot and retained therein.

5. An anchoring device comprising securing feet each having an apertured raised portion and an attaching flange engageable with a surface to form an attaching means, and a flexible tie member having each end passed through the aperture of a securing foot and retained therein, said tie member comprising a length of rope with knots at the ends which retain the tie member in the apertures of said feet.

6. An anchoring device comprising a securing foot having a raised apertured portion, and a tie member having a knotted end portion engaging the apertured portion of the foot and arranged to prevent disengagement from the foot.

In testimony whereof I affix my signature.

EDWARD S. EVANS.